Nov. 25, 1969  R. E. DOWNS ET AL  3,480,807
LINEAR MOTION DEVICES
Filed April 11, 1967  2 Sheets-Sheet 1
FIG.I.
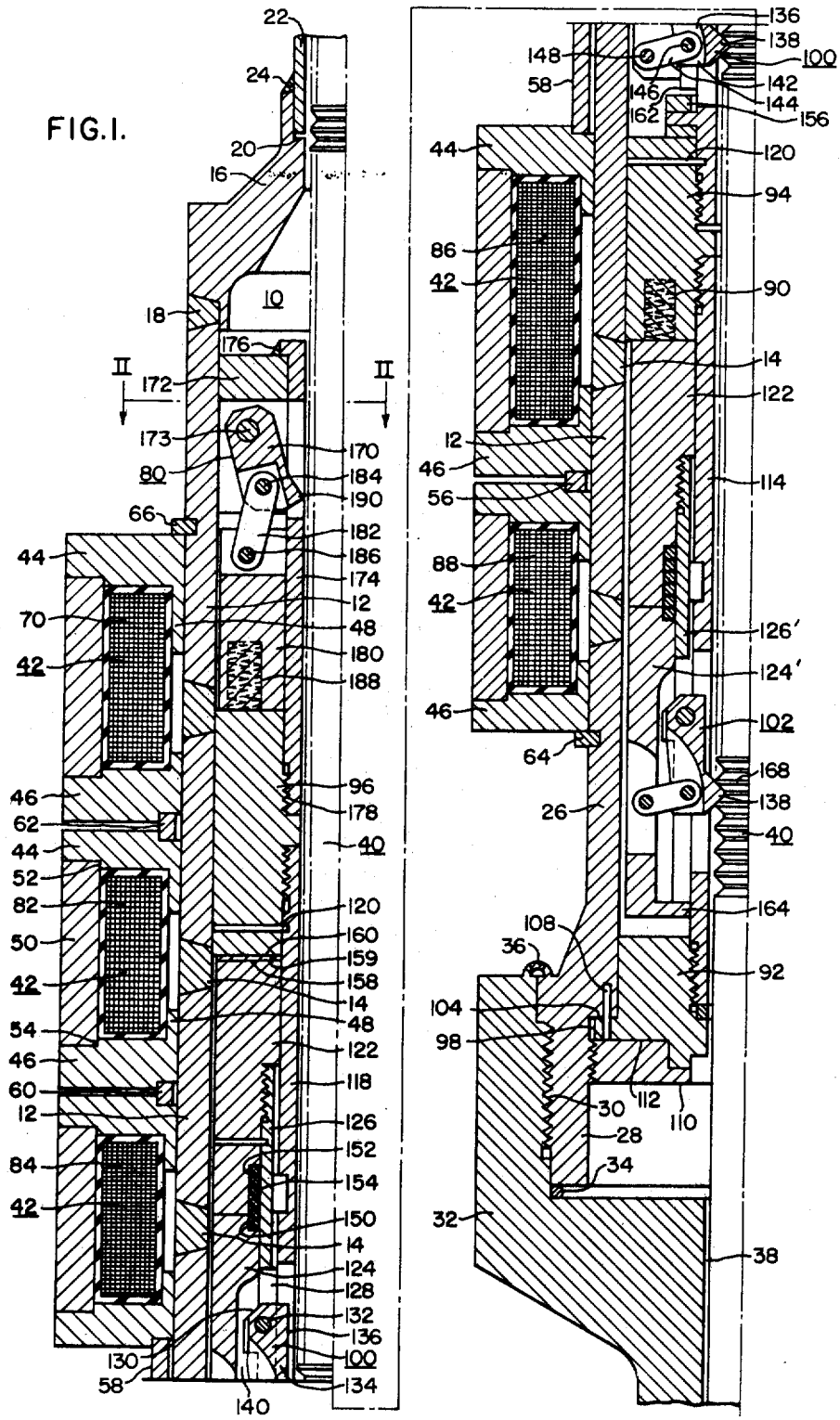

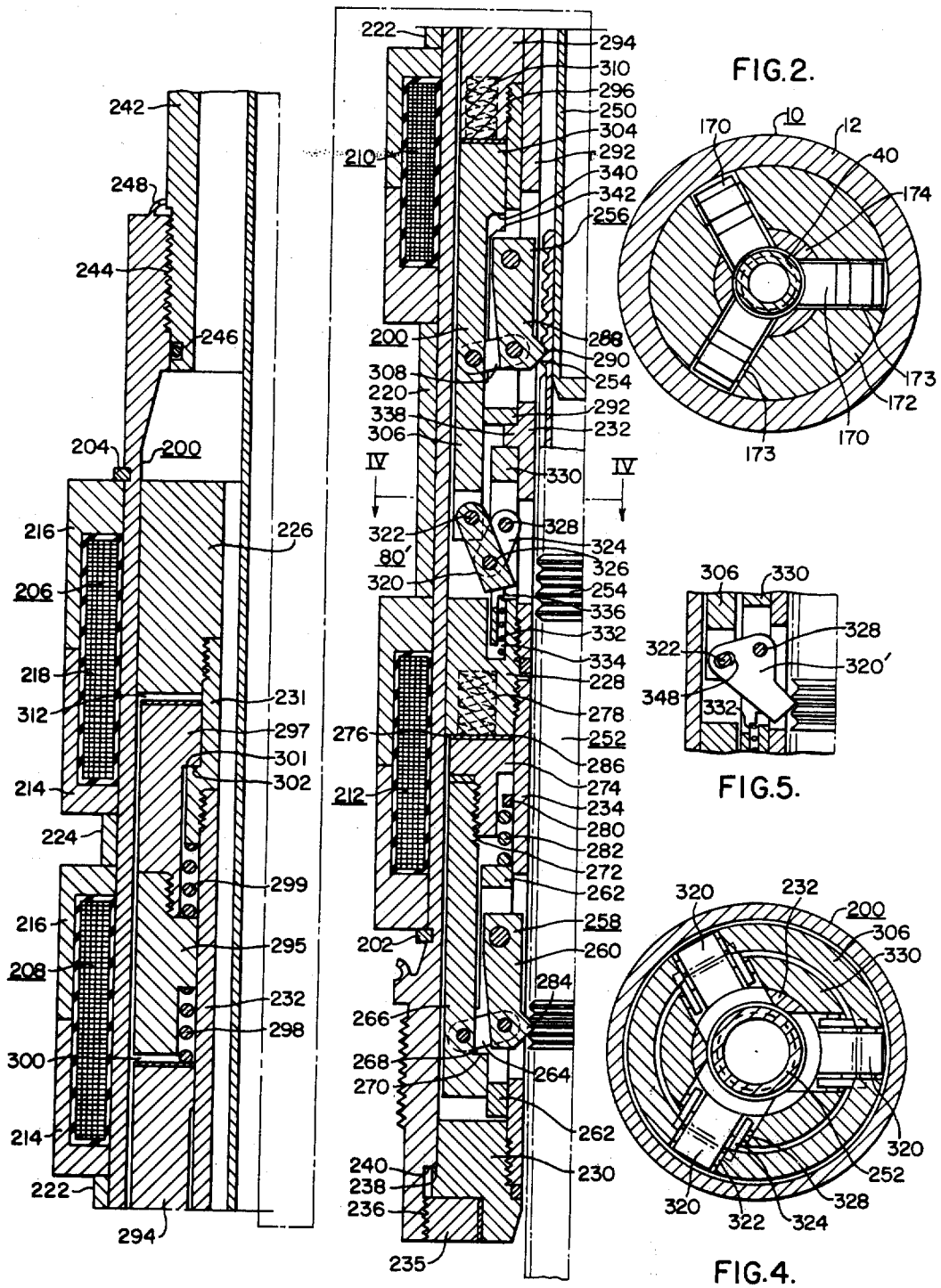

United States Patent Office 3,480,807
Patented Nov. 25, 1969

3,480,807
LINEAR MOTION DEVICES
Robert E. Downs and John S. Karbowski, Penn Hills, Pittsburgh, Pa., assignors to Westinghouse Electric Corporation, Pittsburgh, Pa., a corporation of Pennsylvania
Filed Apr. 11, 1967, Ser. No. 630,005
Int. Cl. H02k 41/02, 33/18, 35/04
U.S. Cl. 310—12
12 Claims

ABSTRACT OF THE DISCLOSURE

A pivotally mounted safety latch is electrically actuated to a released position to permit free movement of a rectilinearly movable element in either of two opposite directions and spring biased to a latched position to so engage the element that it is permitted to move in one direction but prevented from moving in the opposite direction. The latch is so incorporated in a hermetically sealed step-by-step mechanism for actuating the rectilinearly movable element that it does not affect normal operation of the mechanism.

BACKGOUND OF THE INVENTION

This invention relates to linear motion devices and, more particularly, to safely latches for such devices having gripper arms thereon for moving an element rectilinearly in a step-by-step manner.

Linear motion devices are utilized in applications, such as controlling a complex chemical process, wherein emergency conditions require that a movable element be moved to a "safe" position as rapidly as possible and then locked in that position until the emergency is over. The element must be free to move to the "safe" position and must be retained in that position under all emergency conditions.

An object of this invention is to provide a safety latch for a hermetically sealed mechanism for moving an element rectilinearly in a step-by-step manner.

Another object of the invention is to so incorporate the safety latch in the mechanism that it does not interfere with normal movement of the element in either of two opposite directions.

A further object of the invention is to provide a safety latch which requires a relatively small amount of space inside a hermetically sealed tubular housing and does not require any connections externally of the housing.

Still another object of the invention is to move an element having axially spaced teeth thereon engaged by grippers in increments of less than a tooth pitch.

Other objects of the invention will be explained fully hereinafter or will be apparent to those skilled in the art.

SUMMARY

In accordance with the invention, a linearly movable element which is provided with a plurality of axially spaced projections or teeth on its outer surface is disposed inside a hermetically sealed tubular housing. Two sets of grippers mounted inside the housing are actuated by solenoid plungers to engage and be disengaged from the teeth. The solenoid coils for actuating the plungers are mounted externally of the housing. The gripper members are actuated in a predetermined sequence to move the element in either of two opposite linear directions in small increments. A safety latch pivotally mounted inside the housing is actuated by a solenoid plunger to a released position to permit free movement of the element and is spring biased to a latched position to so engage the teeth on the element that it is permitted to move in one direction, but prevented from moving in the opposite direction. Thus, the element is retained in the "safe" position during emergency conditions.

BRIEF DESCRIPTION OF THE DRAWINGS

For a better understanding of the nature and objects of the invention, reference may be had to the following detailed description taken in conjunction with the accompanying drawings, in which:

FIGURE 1 is a view, in longitudinal section, of one half of a linear motion device having a safety latch embodying features of the invention, the other half being similar to the portion shown;

FIG. 2 is a view, in transverse section, taken along the line II—II in FIG. 1;

FIG. 3 is a view, similar to FIG. 1, of another linear motion device having another safety latch embodying features of the invention;

FIG. 4 is a view, in transverse section, taken along the line IV—IV in FIG. 3; and FIG. 5 is a detail view, in section, of another form of safety latch.

DESCRIPTION OF ONE EMBODIMENT

The linear motion device shown in FIG. 1 of the drawings is generally similar to the device fully described in U.S. Patent 3,158,766 issued Nov. 24, 1964, to Erling, Frisch and assigned to Westinghouse Electric Corporation. As described in the aforesaid patent, the gripper members of the linear motion device may be located in three relative positions with respect to the linear element which is moved thereby. One of the relative positions is defined as the "unlatched" position wherein the gripper is not in position for engagement with the linearly movable element. The second relative position is defined as the "latched" position wherein the gripper element is engaged with the linearly movable element and wherein the gripper is subjected to the load of the linearly movable element. The third relative position of the components is defined as the "coupled" position wherein the gripper is located in its engaged position relative to the linearly movable element, but the gripper is not subjected to the load created thereby. Therefore, the difference between the "latched" position and the "coupled" position of the gripper exists not with respect to the radial position of the gripper, inasmuch as the radial position of the gripper would be the same, but by virtue of a different axial position of the linearly movable element. In the "latched" position, the linearly movable element is in an axial position wherein the gripper is subjected to the load thereof, while in the "coupled" position the linearly movable element is in an axial position wherein the gripper is not subjected to a load thereof.

Referring now to FIG. 1, there is illustrated therein a linear motion device suitable for use in a highly pressurized system. Thus, a generally tubular pressure housing 10 is of a thickness capable of withstanding the system pressure. The housing 10 is preferably formed from a material, such as steel, capable of withstanding the high pressures to which it is subjected and comprises a plurality of segments or sections 12 which are joined end-to-end and secured to one another in the aforesaid relationship by annular welds 14. The welds 14 are formed from a different material from the segments 12, preferably by means of non-magnetic weld inserts, to prevent an axial magnetic flow path along the housing 10.

The housing 10 is provided at its upper end with a tapered end closure 16 which is secured to the upper section 12 of the housing 10 by an annular structural weld 18. An inwardly extending shoulder 20 is provided adjacent the outer end of the closure 16 which is adapted to receive a tubular extension member 22 thereon. The extension 22 is secured to the upper closure 16 by suitable means, such as an annular weld 24, and is preferably enclosed at its upper end by means of a closure member (not shown) in order to maintain the integrity of the pressurized housing 10.

A lower end section 26 of the housing 10 is provided with a radially flared portion 28 adjacent its lower end. The outward surface of the flared portion 28 is preferably threaded at 30 to threadedly engage a generally cup-shaped lower end closure 32. Sealing means, such as an O-ring 34, and a seal weld 36 are provided to seal hermetically the lower end of the housing 10. The O-ring 34 is preferably disposed between opposed surfaces of the flared portion 28 and the lower end closure 32 with the O-ring 34 being compressed when the lower end closure 32 is threadedly secured to the flared portion 28. The seal weld 36 may be formed in the manner shown and described in Patent 2,805,789 to E. J. Kreh, Jr. et al. and assigned to Westinghouse Electric Corporation. Thus, the seal weld 36 may comprise opposed annular projections formed on the lower end closure 32 and the lower housing section 26, respectively, with the adjacent surfaces of the projections being welded together.

The lower end closure 32 is provided with an axially disposed central opening 38 therein for receiving a linear element 40 as described hereinafter. It will be understood that the lower end of the closure 32 may be provided with means thereon (not shown) for securing the linear motion device to the outer surface of a pressurized vessel and the like in a suitable manner wherein the integrity of the pressurized system is not impaired.

A plurality of annular solenoid coils 42 are mounted in a generally tandem array on the outer surface of the pressure housing 10 with each of the coils 42 being at least partly coextensive with one of the non-magnetic weld inserts 14. The coils 42 are supported in a predetermined axial array by means of upper and lower supporting members 44 and 46 which engage, respectively, the upper and lower ends of each of the coils 42. Each supporting member 44 and 46 is provided with a shoulder 48 thereon for mounting its associated solenoid coil 42 in spaced relationship with respect to the housing 10. A transition member 50 is disposed to bridge the space formed between shoulders 52 and 54 formed adjacent the outward ends of the supporting members 44 and 46, respectively. The members 44, 46 and 50 also provide a path for magnetic flux produced by their associated coil. Spacers 56, 58, 60 and 62 are disposed between adjacent coil supporting members 44 and 46 in order to maintain the axial spacing of the coils 42.

The entire solenoid coil assembly is maintained at its axial position relative to the housing 10 by means of retaining rings 64 and 66 disposed in grooves in the lower end section 26 and the upper end section 12, respectively, of the housing 10. If desired, additional supporting structure of the nature described in the aforesaid patent may be provided for supporting the solenoid coil assembly.

In the present example of this invention five solenoid coils 42 are illustrated in FIG. 1 and are mounted on the housing 10. Each of the solenoid coils 42 serves a different purpose, as will be described, and each coil may be provided with a pair of lead wires (not shown) for connecting the associated coil to a source of electrical potential for energization of the coil.

Referring now to the solenoid coils 42 as they are disposed from the top to the bottom of the housing 10, the upper coil 70 comprises part of a solenoid means for actuating a safety latch 80 the operation of which will be described more fully hereinafter. The second coil comprises a load transfer coil 82 for transferring the load created by the linear element 40 from one of grippers 100 or 102 to the other gripper in a manner to be described. The third solenoid coil comprises the upper gripper actuating coil 84 which is operable to move the upper gripper 100 between the coupled and unlatched positions. The fourth of the solenoid coils 42 comprises a lift coil 86 which operates to raise the lower gripper 102. The fifth of the solenoid coils 42 comprises a lower gripper actuating coil 88 which operates to move the lower gripper 102 between the unlatched and the coupled positions. A pull-down spring 90 takes the place of a pull-down coil described in the aforesaid patent for lowering the gripper 102.

Referring now to the interior of the housing 10, three stationarily mounted annuli 92, 94 and 96 are axially spaced therein adjacent the inner sidewall of the housing 10. The lower annulus 92 is provided with an outwardly extending circumferential flange 98 which forms a shoulder 104 on the outward surface thereof. The shoulder 104 is engaged by a complementary shoulder 106 formed on the lower section 26 of the housing 10. To prevent relative rotation of the lower annulus 92 and the housing 10, aligned openings are provided in the flange 98 of the annulus 92 and in the lower section 26 of the housing 10. The aligned openings are disposed to receive pins 108, only one of which is shown. A locking ring 110 is provided to be threadedly received by the lower section 26 and is disposed to engage the lower surface 112 of the lower annulus 92 so that relative movement of the annulus 92 and the housing 10 is prevented.

The center stationary annulus 94 is mounted in position within the housing 10 by means of a lower sleeve 114 which threadedly engages at its ends the lower annulus 92 and the center annlus 94, respectively. The upper annulus 94 is stationarily mounted within the housing 10 by an upper sleeve 118 which threadedly engages at its ends the center annulus 94 and the upper annulus 96, respectively. Locking pins 120 are provided in the last-mentioned members in order to prevent relative rotation of the members. Similar locking pins may be provided to prevent relative rotation of the members 114, 94 and 92.

Each of the annuli 94 and 96 are formed from magnetic material and each forms a portion of the magnetic paths of certain of the solenoid coils 42. The lower end of the center annulus 94 forms a portion of the magnetic path of the lift coil 86. The lower end of the upper annulus 96 forms a portion of the magnetic path of the load transfer coil 82.

The upper gripper structure 100 comprises a pair of annular supporting members 122 and 124. The upper member 122 is provided with a tubular extension 126 threadedly secured to the lower end of the inner periphery thereof. The tubular extension 126 is provided adjacent its lower end with three gripper arm supporting members 128 which are flared outwardly adjacent the lower end thereof as illustrated at 130. Three L-shaped gripper arms 136 are pivotally mounted between opposed surfaces of adjacent flared portions 130 of the gripper supporting member 128. To provide such pivotal engagement, a pin 132 is passed through aligned openings in adjacent arms 134 of the flared portions 130 and the gripper arm 136 disposed therebetween. The structure of the gripper assembly is illustrated in more detail in the aforesaid patent.

The lower gripper arm supporting member 124 is provided with a circumferential recess on the inner surface thereof adjacent the lower end denoted by the reference character 140, in which recess the flared portion 130 of the gripper arm supporting member 128 and the gripper arms 136 are disposed. Each of the gripper arms 136 is provided with an elongated recess 142, which extends inwardly from the bottom and outward surfaces thereof, in which recess there is pivotally disposed one end of a link member 144. A pin 146 is passed through aligned openings in the gripper arm 136 and the adjacent end of the link member 144 to permit the aforesaid pivotal engagement of the link 144 and gripper arm 136. A pin 148 is passed through aligned openings in the lower end of the lower support member 124 and the other end of the link 144 to provide pivotal engagement of the link 144 with the lower end of the lower support member 124.

The opposed lower and upper surfaces of the upper and lower supporting members 122 and 124, respectively, are disposed in abutting relationship. Opposed circular recesses 150 and 152 extend inwardly from the abutting surfaces of the supporting members 124 and 122, respectively, and are disposed along the inward sides thereof. Biasing means, such as a helical spring 154, is mounted in the opposed recesses 150 and 152 to bias the upper and lower supporting members 122 and 124 apart. The abutting surfaces of the upper and lower support members 122 and 124 are disposed in the magnetic path of the gripper actuating coil 84 so that upon energization of the coil 84 a gap between the abutting surfaces will tend to close against the biasing force of the spring 154. Upon deenergization of the coil 84 the spring 154 will tend to move the abutting surfaces of the upper and lower supporting members 122 and 124 apart, which movement is also enhanced by the gravitational forces on the lower supporting member 124. Upon separation of the abutting surfaces of the upper and lower supporting members 122 and 124 the gripper arm 136 will pivotally move about the pins 132, 146 and 148 to cause the base or teeth 138 of the gripper arm 136 to pivotally move away from the linear element 40 to the position hereinbefore defined as the unlatched position. A downward movement of the lower support member 124 is limited by stopping means disposed in the path of such movement such as the stoppings rings located at 156.

The load transfer coil 82 provides a magnetic path through the linear motion device which includes in part the upward end 158 of the upper support member 122 and the lower end 160 of the upper annulus 96. Thus, when the load transfer coil is energized, the surfaces 158 and 160 are moved into engagement with a non-magnetic washer 159 and when the load transfer coil 82 is deenergized the gravitational force exerted on the upper support member 122 moves the surfaces 158 and 160 into spaced relationship. The aforementioned separation of the surfaces 158 and 160 upon deenergization of the load transfer coil 82 is limited by engagement of the lower end 162 of the projections 128 of the gripper arm supporting member 126 with the stopping means 156.

The supporting structure for the lower gripper 102 is substantially the same as that described for the upper gripper 100. Thus, there is provided an annular upper gripper supporting member 122' and a lower supporting member of annular configuration designated by the reference character 124'. Essentially the only difference in construction of the lower gripper supporting structure from the upper gripper supporting structure is the formulation of the member 124'. The member 124' has a collar 164 at its lower end which is generally L-shaped in cross-section. A tubular collar 126' is threadedly secured to the inward surface of the upper supporting member 122' for the lower gripper 102. The collar 126' supports the members of the lower gripper 102 in the manner hereinbefore described. When the lift coil 86 is deenergized a pull-down spring 90 forces the lower gripper assembly downwardly until the member 164 engages the annulus 92.

For purposes of illustrating the operation of the load transfer coil it will be necessary to point out the steps utilized for causing incremental movement of the linear element 40. Movement in the upward direction from the position illustrated in FIG. 1 is achieved as follows. With the load transfer coil 82 energized, the load on the grippers created by the weight of the linear element 40 is placed solely upon the upper gripper 100 with the lower gripper 102 being located in the coupled position. Thus, clearance exists between the teeth 168 of the linear element 40 and the base or tooth 138 of the lower gripper 102. The linear motion device as illustrated in FIG. 1 is positioned where the upper gripper actuating coil 84, the lift coil 86, and the lower gripper actuating coil 88 are all energized. The sequence for incrementally moving the linear element 40 in the upward direction comprises deenergizing the lower gripper actuating coil 88 to cause the lower gripper 102 to move from the coupled position to the unlatched position. The lift coil 86 is deenergized, thereby permitting the pull-down spring 90 to drive the lower gripper 102 to a position wherein the collar 164 engages the annulus 92 and the lower gripper 102 may be moved to be coupled to the adjacent lower tooth of the linear element 40. The lower gripper actuating coil 88 is then energized to cause the lower gripper 102 to move from the unlatched position to the coupled position with respect to the adjacent lower tooth of the linear element 40. The lower gripper 102 will now be disposed in a position wherein frictional engagement of the lower gripper 102 and the linear element 40 has not taken place. The prevention of such frictional engagement of the lower gripper 102 with the linear element 40 is achieved by accurately limiting the amount of downward movement of the lower gripper structure 102 by the action of the pull-down spring 90.

The load transfer coil 82 is then deenergized whereupon the surfaces 158 and 160 are moved apart until such downward movement is prevented by engagement of the lower end 162 of the sleeve 126 of the upper gripper 100 with the stop means 156. The aforesaid downward movement of the upper gripper 100 is accurately limited to an amount wherein the load of the linear element is transferred to the lower gripper 102 to place the lower gripper 102 in the latched position and the upper gripper 100 is moved downwardly relative to teeth of the linear element 40 to locate the upper gripper 100 in the coupled position. The upper gripper actuating coil 84 is then deenergized to move the upper gripper 100 from the coupled position to the unlatched position. It will be noted that the latter movement of the upper gripper 100 takes place without frictional engagement of the upper gripper 100 with the teeth of the linear element 40.

Upward movement of the linear element 40 is then achieved by energization of the lift coil 86 to cause the gap between the lower surface of the center annulus 94 and the upper surface of the adjacent upper supporting structure 122' to close whereupon the linear element is moved upwardly one increment. The incremental movement of the linear element 40 is limited to a length wherein after completion of such incremental movement energization of the upper gripper actuating coil 84 will cause the upper gripper 100 to be moved from the unlatched position to the coupled position so that frictional engagement of the upper gripper 100 with the teeth of the linear element 40 during movement of the upper gripper 100 to the coupled position does not occur. Thus, the upper gripper actuating coil 84 is energized to move the upper gripper 100 from the unlatched position to the coupled position and the load transfer coil 82 is then energized to move the upper gripper 100 from the coupled position to the latched position and simultaneously cause the lower gripper 102 to be moved from the latched position to the coupled position. Further incremental movement of the linear element 40 in the upward direction is then achieved by merely repeating the cycle of energization of the solenoid coils 42 as described heretofore.

To effect downward incremental movement of the linear element 40 from the position illustrated in FIG. 1 the following sequence is employed. The load transfer coil 82 is deenergized to move the upper gripper 100 from the latched position to the coupled position and simultaneously to cause the lower gripper 102 to be moved from the coupled position to the latched position. The upper gripper actuating coil 84 is deenergized to move the upper gripper 100 from the coupled position to the unlatched position. The lift coil 86 is deenergized permitting the pull-down spring 90 to cause the lower gripper 102 and the linear element 40 to move downwardly one increment. Gravitational forces assist the spring 90 in moving the gripper 102 and the linear element 40 downwardly.

The upper gripper actuating coil 84 is now energized to cause the upper gripper 100 to move from the unlatched position to the coupled position and the load transfer coil is then energized to cause the upper gripper 100 to move from the coupled position to the latched position and simultaneously to cause the lower gripper 102 to be moved from the latched position to the coupled position. The lower gripper actuating coil 88 is deenergized to cause the lower gripper 102 to be moved from the coupled position to the unlatched position. The lift coil 86 is then energized to move the lower gripper 102 while still in the unlatched position in the upward direction to a position opposite the next successive upper tooth of the linear element 40. The lower gripper actuating coil 88 is then energized to move the lower gripper 102 from the unlatched position to the coupled position and the cycle of energization of the coils is then repeated to effect further incremental downward movement of the linear element 40.

In the event it is desired to lower rapidly the linear element 40, it is merely necessary to deenergize both the upper gripper actuating coil 84 and the lower gripper actuating coil 88 simultaneously to move both the grippers 100 and 102 to the unlatched position. The linear element 40 will then fall freely in the downward direction or be driven in the downward direction by means of a "scram spring" (not shown). Conventional means may be utilized for automatically and sequentially energizing and deenergizing the solenoid coils 42 in the sequences described hereinbefore. Such means do not form a part of the instant invention and may comprise sequence actuating systems well known in the art such, for example, as a relay system or a rotating drum controller.

As explained hereinbefore, it is desirable to provide a means for locking the element 40 in its lowermost position under emergency conditions such as, for example, loss of control power, thereby deenergizing the solenoid coils 42 and causing the element 40 to be lowered to its lowermost position. The element 40 must be retained in its lowermost position even though the entire mechanism be inverted. Accordingly, the safety latch 80 is provided. As shown in FIGS. 1 and 2, the safety latch 80 comprises three equally spaced latch members 170, each of which is pivotally mounted in an annular support member 172 by means of a pivot pin 173. The support 172 is secured at the upper end of a sleeve 174 as by welding at 176. The lower end of the sleeve 174 is threaded into the annulus 96 at 178. A solenoid plunger 180 which is movable axially in the tubular housing 10 is pivotally attached to the latch member 170 by a link 182 and pivot pins 184 and 186 which attach the link 182 to the latch 170 and the plunger 180, respectively. A compression spring 188 is disposed in a recess in the plunger 180 and reacts with the annulus 96 to bias the plunger 180 upwardly. The plunger 180 is so disposed in the magnetic circuit for the solenoid coil 70 that it is pulled downwardly against the force of the spring 188 when the coil 70 is energized. Thus, the latch member 170 is retained in the position shown in FIG. 1 so long as the coil 70 is energized. When the coil 70 is deenergized the spring 188 drives the plunger 180 upwardly, thereby causing a projection 190 on the latch member 170 to engage the teeth 168 on the element 40 to prevent the element from moving in an upward direction as viewed in FIG. 1. However, the spring 188, permits the latch member 170 to function as a ratchet member to permit the element 40 to move downwardly as viewed in FIG. 1. Therefore, the latch member 170 does not interfere with movement of the element 40 in either direction under normal conditions when the coil 70 is energized and the latch member is in a position where it does not engage the element 40. Under emergency conditions when the coil 70 is deenergized the latch member 170 permits downward movement of the element 40, but prevents upward movement. Thus, the element 40 is retained in its lowermost position during the existence of the emergency condition.

DESCRIPTION OF ANOTHER EMBODIMENT

The embodiment of the invention illustrated in FIGS. 3 and 4 is similar to that illustrated in FIGS. 1 and 2 with the exception that the load transfer solenoid is omitted, two lift solenoids are provided, load transfer means is incorporated with one of the gripper assemblies and the safety latch means is incorporated with the other gripper assembly, thereby simplifying the structure and operation of the linear motion device. An outer tubular housing 200, similar to the housing 10, is formed from magnetic material and may include a plurality of circumferential weld inserts (not shown) axially spaced therealong and positioned adjacent the solenoids of the linear motion device in the manner hereinbefore described. A retaining ring or stop 202 is disposed in a groove in the housing 200 at the bottom of the lowermost solenoid to support the solenoid assembly. A similar ring 204 is provided at the top of the uppermost solenoid.

As shown in FIG. 3, four solenoid coils are provided in this arrangement of the invention. The two upper solenoids 206 and 208 are lift solenoids. The third solenoid 210 actuates the upper gripper mechanism and the fourth solenoid 212 actuates the lower gripper mechanism. Each solenoid is provided with an annular two-part housing with each housing part having a generally L-shaped cross-section. The two-part housing is formed from opposed L-shaped members 214 and 216 mounted in opposed relationship and forming an annular space therebetween in which there is disposed a solenoid coil 218. Spacing members 220, 222 and 224 are provided between the solenoid housings to position each of the solenoids relative to the housing 200.

An upper stop member 226, an intermediate stop member 228 and a lower stop member 230, each of annular configuration, are provided within the housing 200 closely adjacent the inner surface thereof. The foregoing stop members serve the same function as the stop members 96, 94 and 92 hereinbefore described. The stop members are fixedly mounted in axially spaced relationship by tubular spacers 231, 232 and 234 threadedly connected to the stop members.

A clamping means, such as a ring 235, is threadedly secured to the housing 200 at 236. The ring 235 forces a shoulder 238 on the stop member 230 against a downwardly facing shoulder 240 on the housing 200, thereby fixing the position of the stop member 230 in the housing.

An upper housing 242, only part of which is shown, is threadedly secured to the upper end of the housing 200 at 244. An O-ring seal 246 and a canopy weld seal 248 are provided to prevent leakage at the joint between the housings 200 and 242. Other details of the housing structure are similar to those hereinbefore described.

A linearly movable element 252, similar to the element 40, is telescopically mounted in a guide tube 250. The element 252 is provided with a plurality of axially spaced teeth 254 which extend circumferentially about the outer surface of the element 252. A pair of gripper assemblies are provded to engage the element 252 and to provide incremental linear movement thereof in opposite directions. The upper gripper assembly is denoted by refence character 256 and the lower gripper assembly is denoted by reference character 258. Each of the gripper assemblies may be formed in a manner similar to that illustrated in FIG. 1, with each assembly including a plurality of pivotally movable gripper arms. The lower gripper assembly is provided with at least one gripper arm 260 which is pivotally attached to a support tube 262. It is desirable to provide more than one arm to prevent side lead on the element 252. A link member 264 is pivotally attached to the gripper arm 260 and to a second support tube or plunger 266. The plunger 266 may be lowered downwardly to a position of engagement with the lower stop 230. The support tube 262 is movable axially and is provided with a downwardly facing shoulder 268 which is disposed to be engaged by a circumferential flange 270 formed on the lower end of the plunger 266 and underlying the shoulder 268. The flange 270 is spaced from the shoulder 268 when the solenoid 212 is deenergized. The plunger 266 is secured by suitable means, such as by threading at 272, to a gripper operating pole 274. The gripper operating pole 274 and the intermediate stop 228 comprise the poles for the solenoid 212. The pole 274 is movable, upon energization of the solenoid 212, toward the lower surface of the stop 228 to close a gap 276 therebetween. Biasing means, such as a spring 278, is disposed in compression between the stop 228 and the upper surface of the pole 274.

Load transfer means are incorporated with the lower gripper assembly 258 and comprise a spring 282 compressed between a projection 280 on the spacer 234 and the upper surface of the support tube 262. When the solenoid 212 is first energized to close the air gap 276 the support tube 262 does not move upwardly against the force of the spring 282 until the flange 270 engages the shoulder 268. The purpose of this last-mentioned movement of the gripper support tube 262 will be described hereinafter in conjunction with the description of the operation of the linear motion device.

Energization of the lower gripper operating solenoid 212 creates a magnetic flux through the gap 276 which tends to close the latter. The pole 274 moves upwardly toward the fixed stop 228 against the force of the coil spring 278. During the initial upward movement of the pole piece 274 to close the gap 276, the support tube 262 remains stationary and the gripper arm 260 is swung inwardly through an opening in the spacer tube 234 until a tip 284 on the gripper arm is in the coupled position. At that point, the flange 270 engages the shoulder 268 and the pole 274 carries the support tube 262, the gripper assembly 258 and the element 252 upwardly for a distance sufficient to move the lower gripper assembly 258 to the latched position and to place the upper gripper assembly 256 in the coupled position. A suitable nonmagnetic washer 286 is mounted on the upper surface of the pole 274 for the purpose of ensuring rapid decay of the flux when the solenoid 212 is deenergized.

The upper gripper assembly 256 is provided with a plurality of pivotally movable gripper arms 288 having wear-resistant inwardly extending tips or projections 290 thereon, with the latter projections being disposed to engage the teeth 254 of the element 252. An upper gripper assembly support tube 292 is connected to a movable pole piece 294 as by threads 296. The upper pole piece 294 forms a movable pole of the lift solenoid 208. Another movable pole 295 of the lift solenoid 208 is threadedly connected to a movable pole 297 of the lift solenoid 206. The upper pole of the solenoid 206 is the stop member 226. Resilient means, such as a coil spring 298, is disposed in the gap 300 of the lift solenoid 208. A spring 299 is disposed between the pole 295 of the solenoid 208 and the lower end of the spacer tube 231. Downward movement of the poles 295 and 297, which are threadedly connected together, is limited by a shoulder 301 on the pole 297 engaging a shoulder 302 on the spacer tube 231. Upward movement of the poles 294, 295 and 297 results in upward movement of the support tube 292 together with the upper gripper assembly 256. In the event the arms 288 of the upper gripper assembly 256 are in the latched position relative to the drive rod 252, the upward movement of the gripper assembly 256 results in the lifting of the element 252.

Pivotal movement of the upper gripper assembly 256 into and out of engagement with the element 252 is accomplished by the energization or deenergization of the upper gripper solenoid 210. The upper gripper solenoid 210 includes as a pole thereof the pole 294 together with a gripper operating pole 304. The gripper operating pole 304 includes a downwardly extending projection or plunger 306 which pivotally supports one end of a link member 308. The link member 308 is pivotally mounted at its other end on the lower end of the gripper arm 288. A compression spring 310 is disposed between the poles 294 and 304. The upper gripper operating solenoid 210 is illustrated in FIG. 3 as being energized, so that the air gap between the poles 294 and 304 is completely closed. Deenergization of the solenoid 210 would result in a downward movement of the pole 304 relative to the pole 294 and would cause pivotal movement of the gripper arm 288 about the link member 308 out of engagement with the teeth 254 of the element 252, thereby moving the arm 288 to the unlatched position. Non-magnetic washers similar to the washer 286 are provided between the poles of the solenoids 206, 208 and 210.

Operation of the linear motion device illustrated in FIG. 3 is achieved by sequentially energizing and deenergizing the solenoids 206, 208, 210 and 212 in a predetermined manner. For example, if incremental upward movement of the element 252 is desired, and if the linear motion device is in the position illustrated in FIG. 3 upward motion will be achieved in the following manner.

In FIG. 3 the upper gripper assembly 256 is illustrated in the coupled position and the lower gripper assembly 258 is illustrated in the latched position. The solenoids 206 and 208 are illustrated as deenergized, and the solenoids 210 and 212 are illustrated as energized. Incremental upward movement is begun by deenergizing the solenoid 212, thereby moving the lower gripper assembly 258 from the latched position to the coupled position and then to the unlatched position. It will be noted that downward movement of the support tube 262 is limited by the lower end of the tube engaging the stop 230. Likewise, downward movement of the plunger 266 is limited by the lower end of the plunger engaging the stop 230. The lift solenoids 208 and 206 are then energized in that order, thereby sequentially closing the gaps between the poles of these solenoids. The upper gripper assembly 256 together with the element 252 are moved incrementally upward in two steps of substantially one half a tooth pitch each for a total distance equal to the pitch between adjacent teeth 254 on the element 252. Next, the lower gripper operating solenoid 212 is energized, moving the lower gripper assembly 258 from the unlatched position to the coupled position and then to the latched position as hereinbefore described. This movement of the lower gripper assembly 258 transfers the load or weight of the element 252 entirely to the lower gripper arm 260 so that the upper gripper arm 288 is now in the coupled position. The upper gripper operating solenoid 210 is deenergized resulting in downward movement of the pole 304 and pivotal outward movement of the upper gripper arm 288 from the coupled position to the unlatched position. The lift solenoids 206 and 208 are then deenergized to open the gaps between the poles of these solenoids. This last-mentioned movement includes downward movement of the pole 304 for a distance equal to the combined lengths of the gaps 300 and 312 between the poles of the solenoids 208 and 206, respectively. The gripper arm 288 is retained in the unlatched position. The upper gripper operating solenoid 210 is then energized to move the upper gripper arm 288 inwardly from the unlatched position to the coupled position. At this stage the linear motion device is now in its initial condition and further upward incremental movement is achieved by repeating the complete cycle.

Operating the two lift solenoids sequentially cuts the step increment to half a tooth pitch to obtain finer positioning of the element 252 without making the teeth on the element too small. It also makes possible the lifting of larger loads through two small gaps than could be possible using just one large gap. An increase in the speed of operation is also obtained.

Downward incremental movement is obtained by first deenergizing the solenoid 210, thereby moving the upper gripper assembly 256 from the coupled position to the unlatched position. The lift solenoids 208 and 206 are then energized, thereby moving the upper gripper arm 288 upwardly an increment equal to the pitch between the teeth 254 of the element 252. The upper gripper operating solenoid 210 is now energized moving the pole 304 into engagement with the pole 294, thereby placing the upper gripper arm 288 in the coupled position. The lower gripper operating solenoid 212 is now deenergized. As a result, the lower gripper arm 260 is moved from the latched position to the coupled position, placing the upper gripper arm 288 in the latched position, and then the lower gripper arm 260 also moves from the coupled position to the unlatched position. The lift solenoids 206 and 208 are now deenergized, thereby moving the upper gripper assembly 256 downwardly a distance equal to one tooth pitch under the force of the springs 298 and 299 and the weight of the element 252. The solenoid 212 is then energized, thereby moving the lower gripper assembly 258 from the unlatched position to the coupled position and then to the latched position which removes the weight of the element 252 from the upper gripper assembly 256. Further downward movement of the element 252 is achieved by repeating the above-described cycle.

In the embodiment of the invention shown in FIG. 3 the safety latch 80' is incorporated with the upper gripper assembly 256. The safety latch comprises three latch members 320 equally spaced around the inside of the housing 200 as shown in FIG. 4. Each latch member 320 is pivotally attached at the lower end of the solenoid plunger 306 by a pin 322. A link member 324 has one end attached to the latch member 320 by a pin 326 and the other end attached by a pin 328 to a member 330 which is movable for a limited distance axially of the element 252. The member 330 is biased upwardly by a spring 332 disposed in a recess 334 in the stop 228 and engaging a shoulder 336 on the member 330. Upward movement of the member 330 is limited by its upper end engaging a projection 338 on the tubular spacer 232. Downward movement of the support tube 292 for the gripper member 288 is limited by the lower end of the tube engaging the projection 338.

Likewise, downward movement of the pole 304 and its integral plunger 306 is limited by a downwardly facing shoulder 340 on the pole 304 engaging a shoulder 342 on the support tube 292. When the lift solenoids 206 and 208 are deenergized and the gripper solenoid 210 is energized the latch member 320 is in the position shown in FIG. 3 and is entirely disengaged from the element 252. If the solenoid 210 is deenergized with the solenoids 206 and 208 also being deenergized the plunger 306 is lowered by the spring 310 until the shoulder 340 engages the shoulder 342, thereby actuating the latch 320 into engagement with the teeth 254 on the element 252. In order for the latch 320 to engage the element 252, both lift solenoids 206 and 208 as well as the gripper solenoid 210 must be deenergized which would represent an emergency condition involving a power failure in the control system. Of course, the solenoid 212 is also deenergized, thereby permitting the element 252 to drop to its lowermost position.

As shown in FIG. 3 movement of the gripper plunger upwardly causes a partial retraction of the latch member 320 and both lift strokes will further retract the latch member. The latch member will not engage the teeth 254 even when the plunger coil is deenergized and only one lift coil is deenergized. To permit engagement of the latch 320 with the element 252 demands that the solenoid 210 and the lift solenoids 206 and 208 all be deenergized.

When the latch member 320 is actuated into engagement with the element 252 it engages the teeth 254 to prevent the element 252 from moving upwardly as viewed in FIG. 3. However, the spring 332 permits the member 330 to be moved downwardly, thereby causing the latch member 320 to function as a ratchet and permit the teeth 254 to move past the latch member 320 as the element 252 moves downwardly. Therefore, the safety latch does not prevent downward movement of the element 252 at any time, but will prevent upward movement under emergency conditions. Under normal operating conditions the safety latch does not interfere with movement of the element 252 in either direction since it is not in engagement with the element 252.

In the structure shown in FIG. 5, the latch member 320' is pivotally mounted on the movable member 330 and is actuated by the plunger 306 by means of the pin 322 which is disposed in an elongated slot 348 in the latch member 320'. Thus, the latch arrangement is simplified by omitting the link 324. The spring 332 permits the latch member 320' to function as a ratchet in the manner hereinbefore described.

From the foregoing description it is apparent that the invention provides a safety latch that will peform the required locking function in a minimum amount of space. The embodiment of the latch shown in FIGS. 3 and 5 does not require a separate electrical circuit and does not require additional power other than that required to overcome latch friction. The structure provides a mechanical interlock preventing the latch from engaging the drive element during all lift and step-down strokes. The safety latch requires only that the latch arm, link and pivot pins be added to the gripper mechanism. This requires only a relatively small increase in the length of the mechanism and does not require any increase in the diameter of the tubular housing for the mechanism.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

We claim as our invention:

1. A linear motion device including a tubular housing, an elongated linearly movable element disposed inside the housing, said element having a plurality of axially spaced teeth on its outer surface, at least two sets of grippers mounted inside the housing to engage and be disengaged from the teeth, solenoid means for actuating the grippers in a predetermined sequence to move the element in either of two opposite linear directions, a pair of support members, latch means located inside the housing and pivotally secured to said support members, means disposed inside the housing for moving one of said support means relative to the other for moving the latch means to a released position to permit free movement of the element, and spring means for biasing said other support means to move the latch means to a latched position to engage the teeth on the element to permit the element to move in one direction and prevent it from moving in the opposite direction.

2. The linear motion device defined in claim 1 wherein the one support member is movable axially in the housing.

3. The linear motion device defined in claim 1 and including a solenoid coil disposed externally of the housing for moving the one support member.

4. The linear motion device defined in claim 3 wherein the spring means actuates the latch means to the latched position when the solenoid coil is deenergized.

5. The linear motion device defined in claim 1 wherein the gripper actuating solenoid means includes solenoid plungers disposed inside the housing and solenoid coils disposed externally of the housing, and also including at least two separate solenoids energized sequentially to move the element linearly in small increments.

6. The linear motion device defined in claim 5 wherein the one support member is one of the gripper solenoid plungers.

7. The linear motion device defined in claim 5 wherein the spring means can actuate the latch means to the latched position only when the solenoid coils are deenergized.

8. The linear motion device defined in claim 1 including additional spring means causing the latch means to function as a ratchet to permit movement of the element in the one direction.

9. The linear motion device defined in claim 6 wherein the latch means includes a latch member and a link pivotally connected together, said latch member being pivotally connected to said one gripper solenoid plunger, the other support member pivotally connected to the link, and spring means permitting the other support member to move in one direction to permit the element to ratchet past the latch member in said one direction.

10. The linear motion device defined in claim 6 wherein the other support member is movable axially of the element, the latch means is pivotally mounted on the one gripper solenoid plunger to prevent movement of the element in one direction, and spring means permitting the other support member to move in one direction to permit the element to ratchet past the latch means in said one direction.

11. A linear motion device including a tubular housing, an elongated linearly movable element disposed inside the housing, said element having a plurality of axially spaced teeth on its outer surface, at least two sets of grippers mounted inside the housing, solenoid means for actuating the grippers to engage the teeth, spring means for disengaging the grippers from the teeth, and at least two separate solenoids energized sequentially to move the element linearly in increments of substantially one half a tooth pitch.

12. The linear motion device defined in claim 11 wherein the gap between poles of each of the separate solenoids is substantially one half a tooth pitch.

References Cited

UNITED STATES PATENTS

| | | | |
|---|---|---|---|
| 3,299,302 | 1/1967 | Frisch | 310—12 |
| 3,158,766 | 11/1964 | Frisch | 310—14 |
| 3,162,796 | 12/1964 | Schreiber et al. | 310—12 XR |
| 3,122,027 | 2/1964 | Frisch et al. | 310—12 XR |
| 2,822,698 | 2/1958 | Gross | 74—128 XR |
| 3,050,943 | 7/1962 | Thorel et al. | 310—12 XR |

MILTON O. HIRSHFIELD, Primary Examiner

B. A. REYNOLDS, Assistant Examiner

U.S. Cl. X.R.

310—14, 15